United States Patent [19]

Green et al.

[11] Patent Number: 4,614,100
[45] Date of Patent: Sep. 30, 1986

[54] SYSTEM FOR THE MONITORING AND CONTROL OF FLOW OF PARTICULATE MATERIAL IN IMPACT TREATMENT EQUIPMENT

[75] Inventors: Robert G. Green, Todmorden; Mark A. Browne, West Didsbury; Richard J. Deloughry, Stretford; Eric J. Hill, Slough, all of England

[73] Assignee: BTR plc, London, England

[21] Appl. No.: 650,360

[22] Filed: Sep. 13, 1984

[30] Foreign Application Priority Data

Sep. 14, 1983 [GB] United Kingdom ............... 8324553

[51] Int. Cl.[4] .............................................. B24C 7/00
[52] U.S. Cl. ...................................... 72/53; 29/90 A; 51/319; 51/415; 366/152
[58] Field of Search ................ 72/53; 51/415, 436, 51/438, 319; 29/90 A; 366/152, 160, 16; 34/43

[56] References Cited

U.S. PATENT DOCUMENTS

| 3,455,588 | 7/1969 | Frantz | 51/415 X |
| 3,485,074 | 12/1969 | Compton | 51/319 |
| 4,420,957 | 12/1983 | Weber | 72/53 X |

FOREIGN PATENT DOCUMENTS 0111194  8/1979  Japan ................ 51/319

Primary Examiner—Francis S. Husar
Assistant Examiner—Steve Katz
Attorney, Agent, or Firm—Rosen, Dainow & Jacobs

[57] ABSTRACT

Air blast peening equipment includes a flow density transducer and a pressure or velocity transducer for measuring flow velocity. Measured values are compared during peening with predetermined desired values. Operation of the apparatus is automatically adjusted, if necessary, by adjustment of flow density and/or flow velocity to maintain these parameters at desired values.

9 Claims, 5 Drawing Figures

SYSTEM FOR THE MONITORING AND CONTROL OF FLOW OF PARTICULATE MATERIAL IN IMPACT TREATMENT EQUIPMENT

BACKGROUND OF THE INVENTION

This invention relates to impact treatment equipment, in particular to air blast equipment, wherein particulate material is conveyed in an air stream to a nozzle through which it is accelerated onto the workpiece being processed. In particular, though not exclusively, it is applicable to shot peening equipment where impact on the workpiece component of spherical particles results in a compressively stressed layer being created at the component surface, which will considerably extend the component's resistance to fatigue failure under alternating or fluctuating tensile stresses.

In order to achieve the optimum benefits and consistency from the shot peening process it is essential that the size of the spherical particles and the impact energy onto the component surface be closely controlled.

The control of the particle size is a function of the original grading of the material coupled with continual size and shape classification as it is recovered after impact for reuse.

The impact energy on the work surface is dependent upon the density of feed up to the nozzle, and the air pressure at the entry to the nozzle. As an alternative to the latter, the velocity of the particle stream in the hose to the nozzle can be used since either parameter is related to the velocity of the stream leaving the nozzle.

Normal practice is to control the feed density by means of an adjustable feed valve between the media storage hopper, and the hose leading to the nozzle; the nozzle discharge velocity is controlled by means of a pressure regulator in the compressed air supply line. The required setting of the feed valve and pressure regulator are established so as to achieve the required impact of the particles on the component to obtain the optimum peening effect, and are preset whenever the process is repeated.

While this preset condition can be checked at the start and finish of the processing of each component by means of the curvature produced on Almen Test strips in order to verify that the required impact intensity is produced, deviations may occur during the processing which may not be detected. For example, moisture in the compressed air supply can result in coagulation of the peening media and cause irregular flow of media through the feed valve. A similar effect can result if oversize debris accidentally contaminates the media. Furthermore the compressed air supply pressure may fall momentarily below the regulated setting.

These and other conditions may result in undetected changes in the peening intensity during a processing cycle, and therefore in loss of consistency of performance. An object of the present invention is to ensure consistency of performance.

SUMMARY OF THE INVENTION

In accordance with the present invention, the particle flow density and the flow velocity are monitored during operation, and if either deviates from a preset value by more than a predetermined amount, control action is automatically effected, so that the flow density and flow velocity are maintained within respective predetermined ranges.

The flow density is preferably monitored by means of one or more flow noise transducers.

The flow velocity can be monitored by various forms of measurement for example the pressure of the compressed air supply, the pressure at the nozzle inlet, measurement of the air flow in the compressed air supply line, the blast hose velocity, the compressed air flow into the apparatus which will also indicate the flow velocity, the flow velocity at the nozzle outlet, or by noise measurement.

BRIEF DESCRIPTION OF THE DRAWINGS

The invention will be further described with reference to the accompanying drawings, in which.

DESCRIPTION OF THE PREFERRED EMBODIMENTS

Figure 1:
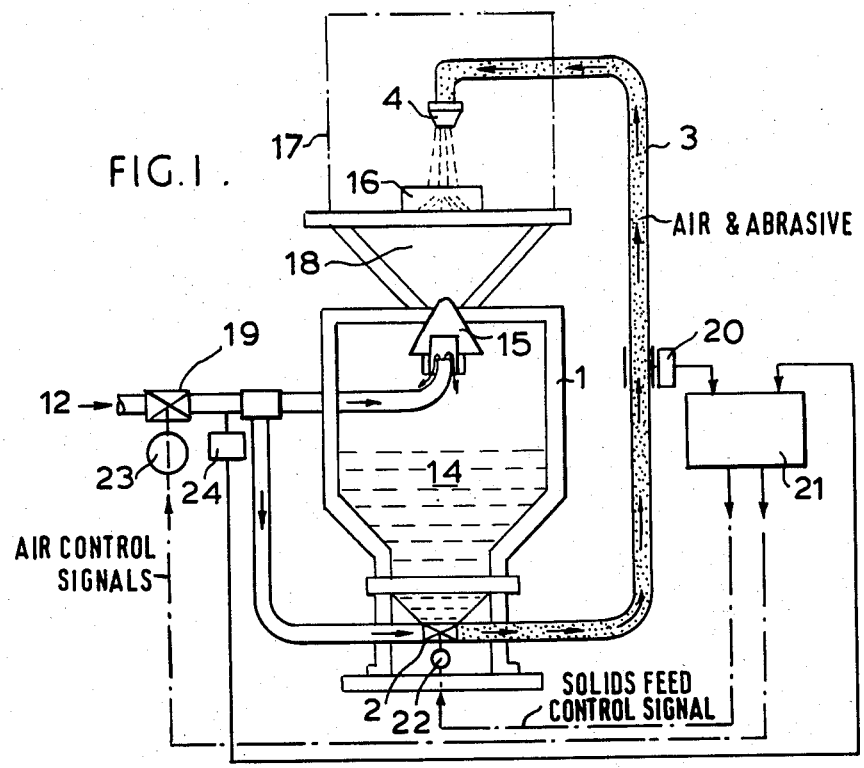
FIGS. 1 to 3 respectively show compressed air peening machines embodying the invention, shown schematically.

FIG. 1 shows a pressure-fed peening machine in which the particulate peening media are stored in a vessel 1 which is pressurized during operation and are metered into a blast air stream by means of a feed valve 2. The air stream conveys the particulate media at high velocity through a blast hose 3 to a blast nozzle 4, where the particles are further accelerated by the expansion of the air as it is exhausted through the nozzle.

The compressed air is supplied from any suitable source 12 through a pressure regulating valve 19. The air pressure also closes a dump valve 15 to seal the loading aperture of the vessel 1 which communicates with a storage hopper 18 through which the particulate media can be returned to the vessel 1 after being used. Conventionally, the work piece 16 being peened is blasted in an enclosure 17 from which the particles are returned to the hopper 18 by gravity, or mechanically or pneumatically. The particulate media may be sorted before being reused, to eliminate under-sized particles and/or over-sized debris.

The compressed air pressure regulator 19 regulates the pressure at the entry to the nozzle 4 and hence the discharge velocity onto the work piece 16.

In the blast hose from the feed valve 2 to the nozzle 4 is a capacitance flow noise transducer 20 which monitors the mass flow along the blast hose 3. This can be of the type described in British Patent Specification No. 1 270 112.

The transducer consists of a non-intrusive electrode which forms a capacitor flush with the wall of the hose and has its capacitance modulated by the turbulence of the flow particles passing through its sensing field. These changes in capacitance are converted into a frequency modulated signal by a capacitance to frequency converter. This is isolated from external loading effects by a buffer amplifier.

The buffered signal is converted by a frequency to voltage converter into a d.c. voltage dependent upon frequency variation which is then amplified by an automatic frequency control amplifier. A low pass filter ensures that only low frequency components are fed back. These low frequency components represent gross, slow changes in capacitance at the electrode.

The filtered signal biases a voltage to capacitance converter which forms part of the electrode circuit and corrects for particle build-up at the electrode thus preventing a large change in standing capacitance, which would otherwise swamp the system and take it out of its working range. The signal from the frequency to voltage converter is also fed into an a.c. amplifier which provides fixed gain. This amplified signal is full-wave rectified, averaged and converted into a signal suitable, after conversion by an analogue to digital converter, for transmission to a microcomputer 21. The signal is proportional to the concentration (mass flow) of the shot in the blast hose.

The transducer 20 may have two outputs. The first is from the a.c. amplifier and this output is an indication of the instantaneous solids concentration in the turbulent flow and can be used for cross-correlation flow velocity measurement (see FIG. 3 described below). The second output is from the rectifier/averager circuit. Only the second output is utilized in the embodiment shown in FIG. 1.

A pressure transducer 24 is incorporated in the air supply line downstream of the pressure regulator 19 to provide a signal proportional to pressure, after conversion by the analogue to digital converter, to the microcomputer.

Both the feed valve 2 and pressure regulator 19 are power operated, conveniently by means of linear motors or rotary actuators 22 and 23, in turn controlled from the microcomputer. A typical system of operation is as follows:

The required parameters in terms of media flow rate and regulated pressure for a given peening intensity, previously established e.g. by experiment, are programmed into the microcomputer. The computer program then controls the sequential sampling of a number of input voltages from the media mass flow transducer 20 and regulated pressure transducer 24. These are compared with the required pre-programmed parameters and if the comparison produces an error signal of more than a predetermined size, the computer generates an output to adjust the powering units of the feed valve 2 and/or pressure regulator 19 until the required values of flow density and velocity are established as determined by the monitoring transducers.

The sampling and averaging are carried out at frequent intervals, to avoid undue fluctuations in performance before monitoring and correction.

Figure 2:
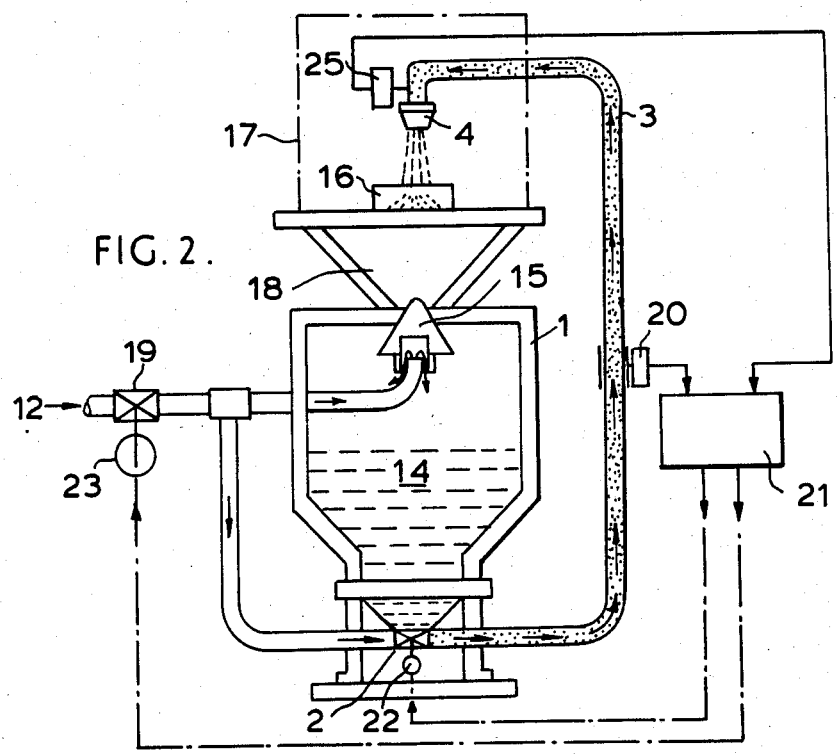

FIG. 2 shows a machine similar to that of FIG. 1, except that the operating pressure signal is taken from a pressure transducer 25 immediately at the entrance to the nozzle 4.

This has the advantage that the pressure signal obtained gives a direct indication of the condition at the nozzle inlet and hence is more directly indicative of the nozzle discharge velocity. By recording the pressure at the air supply to the machine, it is less responsive to changes in condition along the air flow system which could affect the nozzle inlet pressure and thus affect the nozzle performance. The signal from the nozzle pressure transducer is regularly sampled and any deviation from the required condition is corrected by operation of the power unit 23 to adjust the setting of the regulator 19.

However, the transducer recording the nozzle inlet pressure is connected to a pressurized line containing both air and peening media and precautions must be taken to protect the transducer from the effect of damage by the use of effective filters in the sensor line.

Figure 3:
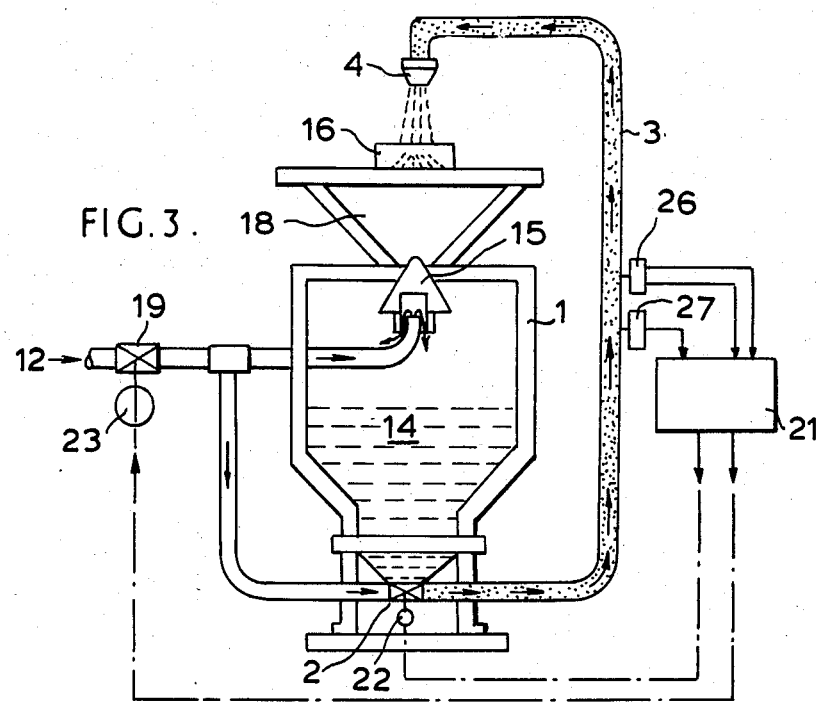

A further variation of the system of monitoring and control is shown in FIG. 3 wherein the mass flow of the media and the mass velocity along the blast hose 3 are the parameters which are monitored and controlled. In this system, two mass flow transducers 26 and 27 are located along the blast hose 3, spaced apart by a predetermined distance.

Both transducers provide a signal as described for FIG. 1, in order to denote the mass flow of the media along the blast hose 3. The signal from transducer 26 is used to monitor the mass feed rate and control it via the power unit 22 connected to the feed valve 2.

In addition, the microcomputer incorporates a cross correlator 28 connected to both of the mass flow noise transducers to indicate the mass velocity of the media along blast hose 3.

Figure 5:
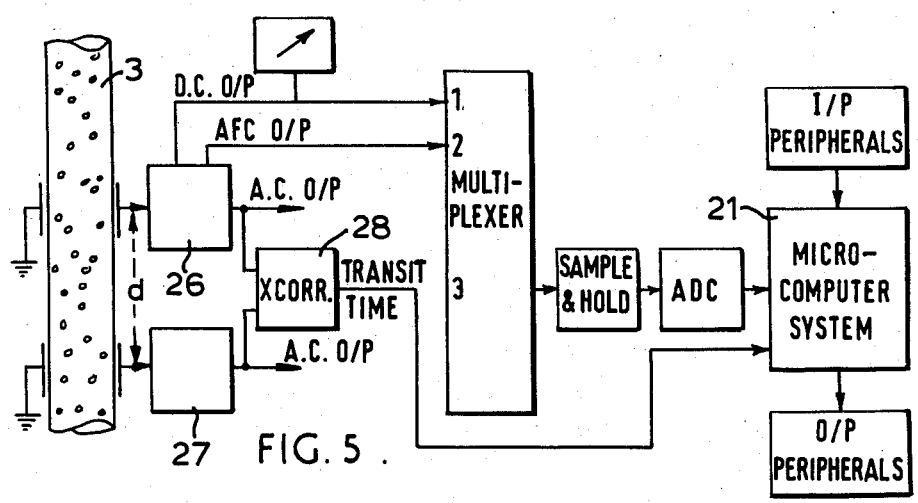
FIG. 5 shows a block diagram of an instrumentation point.

As shown in FIG. 5 the cross correlator compares the a.c. outputs from the two transducers 26 and 27, and computes the transit time between them, by searching for the peak of the cross correlation function. If the signal from the first transducer is x(t) and the second is y(t) then the cross correlation function between x(t) and y(t) is given by $$\Phi_{xy}(t) = \lim 1/T \int_O^T y(t)\,x(t-\tau)d\tau$$

which is a maximum when the correlator time delay is equal to the material transit time between the two transducers. The correlator output is typically an 8 bit digital signal which is proportional to the transit time. The principle of cross correlation flow noise measurement is described in British Patent Specification No. 1 235 856.

An alternative arrangement to cross correlating the signal from two capacitance transducers as shown in FIG. 5 is to cross correlate the output signals from two electrodynamic sensing transducers which detect the instantaneous electrostatic charge on the material flowing past suitable electrodes. Detection of electrostatic charge in flowing materials is covered in British Patent Specification No. 1 335 963.

Many minor variations may be made without departing from the principle of the invention namely the monitoring and control of the media flow density in the air stream, and of the pressure or mass flow velocity, to indicate the velocity from the nozzle.

For example instead of monitoring the supply pressure, nozzle pressure, or mass flow velocity, it is possible to incorporate an air flow meter in the compressed air supply to the machine or nozzle with feed back arranged to adjust the pressure regulator setting in the event of undue deviation from the preset flow requirement.

The flow velocity can also be monitored by measurement of the flow velocity at the nozzle outlet. For example, the flow velocity at the nozzle outlet can be measured by means of two photo-transistors arranged to record the nozzle outlet flow pattern and coupled to a cross-correlator (in a manner similar to that shown in FIG. 5) so as to determine the nozzle outlet velocity by determination of the transit time for maximum correlation.

In another variation, when using a multi-nozzle system supplied from a single pressure vessel or storage hopper, the average value of supply or nozzle pressure, or hose velocity, is monitored and compared with the desired average value. Any adjustment is made as previously described in order to achieve the required average value. With such a system, any deviation of a single nozzle from the required average condition is also measured and an alarm or similar warning activated in the event of excessive deviation.

A further refinement may be incorporated to reduce the risk of blockage of the feed valve due to coagulation from moist compressed air, or from over-size debris. Although the monitoring and control described above would open the valve to clear such blockages, there will be a delay before the feed has recovered which could result in an area of the component being inadequately treated. This risk can be overcome or greatly reduced by the generation of a 'dither' signal from the computer to provide high frequency fluctuation of the feed control valve. Another known technique is to arrange pulse width modulation of the valve at a sufficiently high frequency to provide a generally smooth flow of media from the nozzle.

Figure 4:
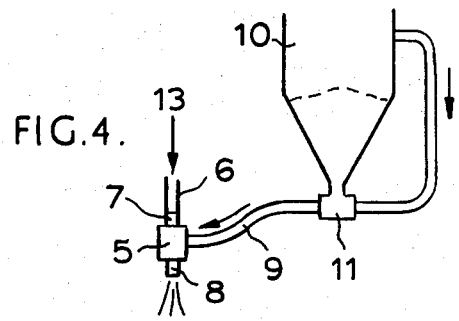
FIG. 4 shows very schematically the arrangement of a suction-fed peening machine to which the invention can be applied.

The invention is also applicable to other forms of impact treatment equipment, for example to a suction-fed system as shown schematically in FIG. 4. In such a system, the blast nozzle 5 is an air ejector. Compressed air from a suitable source 13 is fed through a hose 6 into the air nozzle 7 and is exhausted through a secondary nozzle 8. The air flow induces an air flow into the nozzle which conveys the peening media along a hose 9 from a storage hopper 10 by way of a feed valve 11. In this system, the storage hopper is not pressurized. Measurements representin the particle flow density and the flow velocity are obtained by suitably placed transducers analogous to those described with reference to FIGS. 1 to 3.

Further alternatives and modifications will suggest themselves to the reader skilled in the art.

We claim:

1. In an apparatus including a nozzle, a compressed gas supply line, a source of particulate material, duct means having an inlet connected to said supply line and having an outlet connected to said nozzle, said supply line, said duct means and said nozzle defining a gas stream path for providing a stream of gas, and metering means connected to said duct means and particulate material source for feeding said particulate material into said gas stream for entraining said material in said gas stream, a path between said metering means and said nozzle defining a particulate material path, the improvement therein comprising;

first monitoring means connected to said gas stream path for monitoring the flow density of the particulate material, second monitoring means connected to said gas stream path for monitoring the flow velocity of said material, and control means comprising a first control loop connected to said flow density monitoring means and first flow control means connected to said first control loop to correct automatically the flow density on detection of a predetermined deviation of the monitored flow density from a first preset value, and a second control loop connected to said flow velocity monitoring means and second flow control means connected to said second control loop to correct automatically the flow velocity on detection of a predetermined deviation of the monitored flow velocity from a second preset value.

2. Apparatus according to claim 1, in which the first monitoring means comprise at least one flow noise transducer.

3. Apparatus according to claim 1 or 2 wherein the second monitoring means comprise a pressure transducer responsive to the pressure in the compressed gas supply.

4. Apparatus according to claim 1 or 2 having said nozzle for expulsion of the particulate material and gas, and in which the second monitoring means comprise a pressure transducer located at the nozzle inlet.

5. Apparatus according to claim 1 or 2 in which the second monitoring means comprise two flow noise transducers spaced along the particulate material path and respectively connected to a cross-correlator arranged to determine therefrom the mass flow velocity.

6. Apparatus according to claim 1 or 2 wherein the second monitoring means comprise a gas flow meter in the compressed gas supply line.

7. Apparatus according to claim 1 or 2 having said nozzle for explusion of the particulate material and gas and in which the second monitoring means measure the velocity at the nozzle outlet.

8. A method of impact peening a work piece, comprising the steps of;

conveying particulate peening material in a gas stream to a nozzle through which it is accelerated onto the work piece, monitoring the material flow density, monitoring the flow velocity, comparing the monitored flow density during peening with a first predetermined value, comparing the monitored flow velocity during peening with a second predetermined value, and separately controlling the flow density and flow velocity during peening to maintain their respective values within respective predetermined ranges.

9. A method of impact peening a work piece as claimed in claim 8, wherein the step of monitoring the flow velocity includes monitoring the pressure of the gas stream at an inlet to said nozzle, said nozzle inlet gas pressure being indicative of said flow velocity.

* * * * *